United States Patent
Huang et al.

(10) Patent No.: US 8,370,370 B2
(45) Date of Patent: Feb. 5, 2013

(54) BRIDGING REAL-WORLD WEB APPLICATIONS AND 3D VIRTUAL WORLDS

(75) Inventors: Yunwu Huang, Chappaqua, NY (US); Jalal Uddin Mahmud, Centereach, NY (US); Roger Alan Pollak, Pleasantville, NY (US); John J. Ponzo, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 466 days.

(21) Appl. No.: 11/872,557

(22) Filed: Oct. 15, 2007

(65) Prior Publication Data

US 2009/0100352 A1  Apr. 16, 2009

(51) Int. Cl.
*G06F 17/00* (2006.01)

(52) U.S. Cl. ........ 707/755; 707/756; 707/792; 715/757; 715/848

(58) Field of Classification Search .................. None
See application file for complete search history.

(56) References Cited

U.S. PATENT DOCUMENTS

| | | | |
|---|---|---|---|
| 7,487,513 B1 * | 2/2009 | Savchenko et al. | 719/320 |
| 7,735,018 B2 * | 6/2010 | Bakhash | 715/782 |
| 2002/0114537 A1 | 8/2002 | Sutula, Jr. | |
| 2002/0152273 A1 * | 10/2002 | Pradhan et al. | 709/206 |
| 2003/0038836 A1 * | 2/2003 | Ronald et al. | 345/738 |
| 2003/0050864 A1 | 3/2003 | Trajkovic et al. | |
| 2003/0061284 A1 | 3/2003 | Mandarino et al. | |
| 2004/0054667 A1 * | 3/2004 | Kake et al. | 707/3 |
| 2005/0081161 A1 | 4/2005 | MacInnes et al. | |
| 2005/0086612 A1 * | 4/2005 | Gettman et al. | 715/848 |
| 2005/0090933 A1 * | 4/2005 | Ebert | 700/245 |
| 2005/0166163 A1 * | 7/2005 | Chang et al. | 715/863 |
| 2006/0063646 A1 | 3/2006 | Chiang | |
| 2006/0271930 A1 | 11/2006 | Letizi et al. | |
| 2007/0100705 A1 | 5/2007 | Chen | |

(Continued)

FOREIGN PATENT DOCUMENTS

| KR | 20030094703 A | 12/2003 |
|---|---|---|
| WO | 03085572 A1 | 10/2003 |

(Continued)

OTHER PUBLICATIONS

Korean Office Action dated Sep. 5, 2011 regarding related Application No. 032127014 (English translation not available).

*Primary Examiner* — Pierre Vital
*Assistant Examiner* — Mohammad S Rostami
(74) *Attorney, Agent, or Firm* — Yee & Associates, P.C.; William Stock

(57) ABSTRACT

A computer implemented method, data processing system, and computer program product for automating information sharing and propagation of control commands and events between software objects created in Web applications and 3D virtual world objects created in virtual world applications. A relationship is created to link a Web object with one or more virtual world objects, or to link a virtual world object with one or more Web objects. A Web application may retrieve the meta-data of one or more virtual world objects or send commands or events to manipulate one or more virtual world objects to which a Web object within the Web application is linked. A virtual world system may retrieve the meta-data of one or more Web objects or send commands or events to manipulate one or more Web objects to which a virtual world object within the virtual world system is linked.

24 Claims, 5 Drawing Sheets

U.S. PATENT DOCUMENTS

| | | |
|---|---|---|
| 2007/0101276 A1 | 5/2007 | Yuen |
| 2007/0203817 A1* | 8/2007 | Jung et al. ............... 705/35 |
| 2007/0211047 A1* | 9/2007 | Doan et al. .............. 345/419 |
| 2007/0260702 A1* | 11/2007 | Richardson et al. ...... 709/217 |
| 2007/0268299 A1* | 11/2007 | Jung et al. .............. 345/581 |
| 2007/0288598 A1* | 12/2007 | Edeker et al. ............ 709/217 |
| 2008/0071750 A1* | 3/2008 | Schloter ...................... 707/3 |
| 2008/0162498 A1* | 7/2008 | Omoigui .................. 707/10 |
| 2008/0163379 A1* | 7/2008 | Robinson et al. .......... 726/27 |
| 2008/0178091 A1* | 7/2008 | Almeida ................... 715/733 |
| 2008/0263469 A1* | 10/2008 | Nasle et al. ............... 715/771 |
| 2009/0083738 A1* | 3/2009 | Kruglick et al. .......... 718/100 |
| 2009/0089439 A1* | 4/2009 | Benco et al. .............. 709/228 |

FOREIGN PATENT DOCUMENTS

WO      04001548 A2      12/2003

* cited by examiner

BRIDGING REAL-WORLD WEB APPLICATIONS AND 3D VIRTUAL WORLDS

BACKGROUND OF THE INVENTION

1. Field of the Invention

The present invention relates generally to an improved data processing system, and in particular, to a computer implemented method and apparatus for processing software applications that have both a Web interface and a virtual world interface. Still more particularly, the present invention relates to a computer implemented method, apparatus, and computer usable program code for automating the sharing of information and the propagation of control commands or events between software objects created in Web applications and 3D virtual world objects created in virtual world applications.

2. Description of the Related Art

A software application is a system implemented in software for accomplishing a given purpose. A Web application is a software application having a client-side component and a server-side component linked together through a Web server. The client-side component is in the form of Web pages, whereas the server-side component can be built using a variety of technologies such as JSP (JavaServer Page), Java Servlet, and PHP. The Web pages define the user interface (UI) through declarative languages, such as Hypertext Markup Language (HTML) and Extensible Markup Language (XML), and logic using scripting languages such as JavaScript. The Web browser on the client device processes and displays the Web pages. The client Web pages use Hypertext Transfer Protocol (HTTP) to communicate with a Web server that links client requests to proper server components that perform processing which typically includes database access and enterprise business logic, such as e-commerce. The server components respond through the Web server, which uses HTTP to send the response back to the client.

A virtual world is a software application that provides a computer-based simulated environment in which virtual characters, called avatars, can reside, visit different places, and interact with one another. A virtual world environment is typically represented in a 3D representation that mimics the real-world environment. Avatars are representations of people residing in the virtual worlds.

Existing virtual world software systems focus on using the virtual world environment to model real-world systems. Examples of such existing systems include U.S. Patent Publication No. 20070101276A1, which describes a system for modeling Web sites using a virtual world system. U.S. Patent Publication No. 20070100705A1 simulates the clothes and accessory shopping process with a 3D virtual reality setting. U.S. Patent Publication No. 20060063645A1 discloses an electronic device that connects fitness equipment to virtual world applications. U.S. Patent Publication No. 20030061284A1 describes a system for remotely controlling a virtual representation of a product with the controlling process, such as navigation, coupled with voice communication. U.S. Patent Publication No. 20030050864A1 describes a method to allow 3D rendering of some clothes on a 3D model, where the clothes and models are selected by the user through a Web site.

However, these existing virtual world software systems do not contain the feature of sharing information in the virtual worlds with Web applications, and vice versa. In addition, these existing virtual world software systems also do not contain the feature of propagating commands and events from a Web application to a virtual world, and vice versa.

SUMMARY OF THE INVENTION

The illustrative embodiments provide a computer implemented method, data processing system, and computer program product for processing software applications for automating the sharing of information and the propagation of control commands or events between software objects created in Web applications and 3D virtual world objects created in virtual world applications. When a request is received from a non-virtual world interface for meta-data about one or more virtual world objects linked to a non-virtual world object, the illustrative embodiments obtain mapping information linking the non-virtual world object to the one or more virtual world objects. The illustrative embodiments retrieve meta-data about the one or more virtual world objects using identifiers in the mapping information, and then send the meta-data about the one or more virtual world objects to the non-virtual world interface.

Similarly, when a request is received from the virtual world interface for meta-data about one or more non-virtual world objects linked to a virtual world object, the illustrative embodiments obtain mapping information linking the virtual world object to the one or more non-virtual world objects. The illustrative embodiments retrieve meta-data about the one or more non-virtual world objects using identifiers in the mapping information, and then send the meta-data about the one or more non-virtual world objects to the virtual world interface.

BRIEF DESCRIPTION OF THE DRAWINGS

The novel features of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
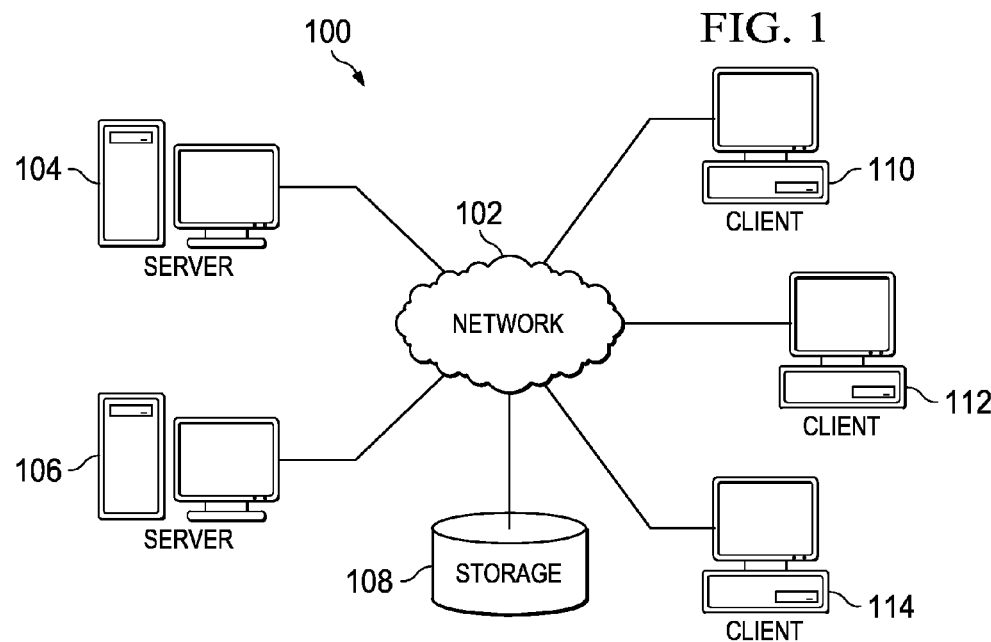
FIG. 1 depicts a pictorial representation of a distributed data processing system in which the illustrative embodiments may be implemented.
Figure 2:
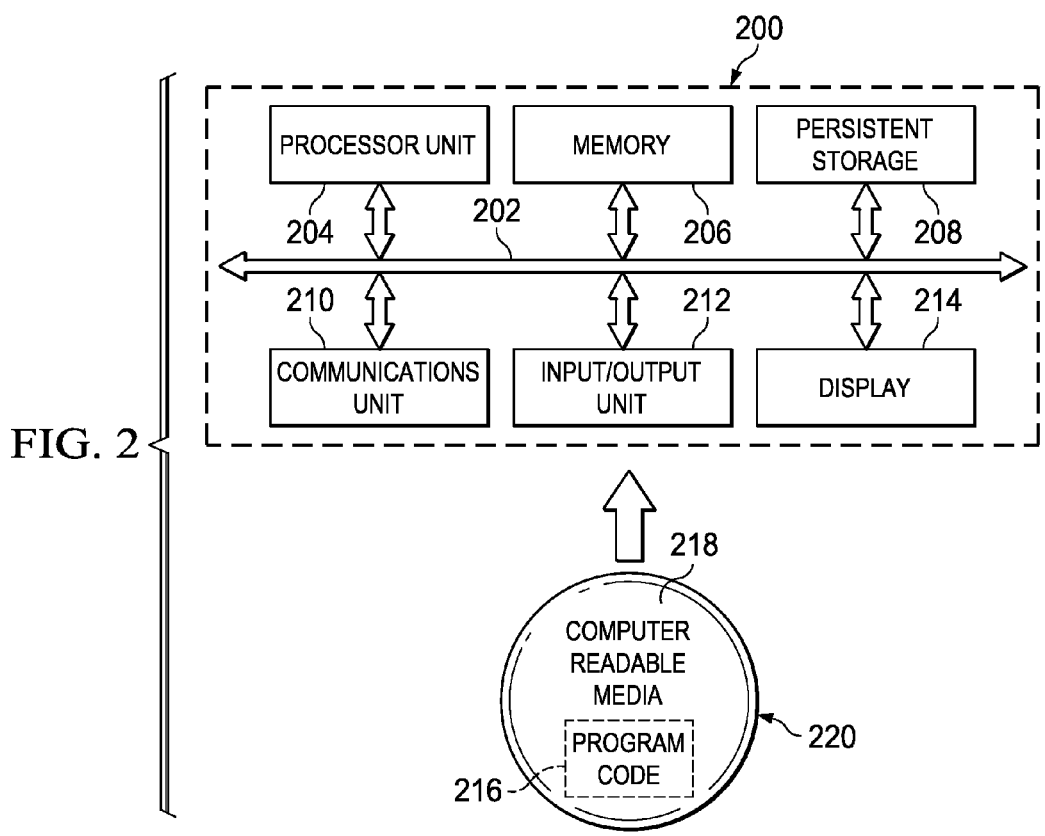
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as, program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200. The tangible form of computer readable media 218 is also referred to as computer recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache that may be present in communications fabric 202.

The illustrative embodiments disclose techniques that provide a more satisfying experience for a user operating software systems having both a Web interface and a virtual world interface. Examples of such software systems include an e-commerce application that has a Web-based user interface and a virtual store in a virtual world system. The illustrative embodiments enable an object in a Web application to be linked to one or more objects defined in a virtual world system. Conversely, a virtual world object may be linked to one or more objects in a Web application. For example, a Web application may contain an object that is a product item in a Web-based ecommerce system. A virtual world system may contain an object that is a 3D rendered product item in a virtual store. The linking relationship created between a Web application object and a virtual world object allows a software system having features of the illustrative embodiments to use an identifier (ID) of the Web object to retrieve or trace the ID(s) of those virtual world object(s) linked to the Web object. Conversely, the software system may also use the ID of a virtual world object to retrieve or trace the ID(s) of Web object(s) linked to the virtual world object.

If a Web object is linked to one or more virtual world objects, the illustrative embodiments allow the Web application that processes and manages the Web object to retrieve the meta-data about those virtual world objects linked to the Web object. The meta-data of any given virtual world object may include property information, contextual information, or any application-specific information. The property information of a virtual world object may include, for example, the color, size, and location of a virtual world object. The contextual information of a virtual world object may include, for example, the environmental settings of the virtual world object. The application-specific information of a virtual world object is generated by a particular virtual world application, and thus may be any arbitrary data.

If a virtual world object is linked to one or more Web objects, the illustrative embodiments allow the virtual world application that processes and manages the virtual world object to retrieve the meta-data about those Web objects linked to the virtual world object. The meta-data of any given Web object may include property information, contextual information, or any application-specific information. The property information of a Web object may include, for example, the text description and picture of a Web object. The contextual information of a Web object may include, for example, the higher-level group or category to which of the Web object belongs. The application-specific information of a Web object is generated by a particular Web application, and thus may be any arbitrary data.

The illustrative embodiments also allow a user to use the Web interface to create new virtual world objects in a virtual world application in a software system having features of the illustrative embodiments. Conversely, a user of a virtual world application may create a new Web object in a Web interface where the virtual world application and the Web interface are components in a software system having features of the illustrative embodiments.

Furthermore, if a Web object is linked to one or more virtual world objects, the illustrative embodiments allow the Web application that processes and manages the Web object to send commands or events to manipulate those virtual world objects linked to the Web object. Conversely, if a virtual world object is linked to one or more Web objects, the illustrative embodiments allow the virtual world application that hosts the virtual world object to send commands or events to manipulate those Web objects linked to the virtual world object.

Figure 3:
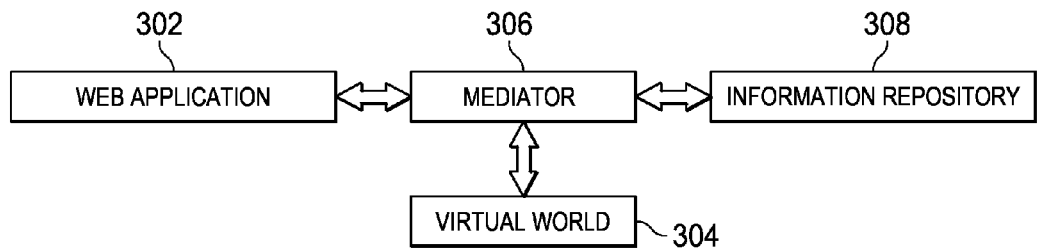
FIG. 3 depicts a pictorial representation of a high level architecture of the system in which the illustrative embodiments may be implemented.
Figure 4:
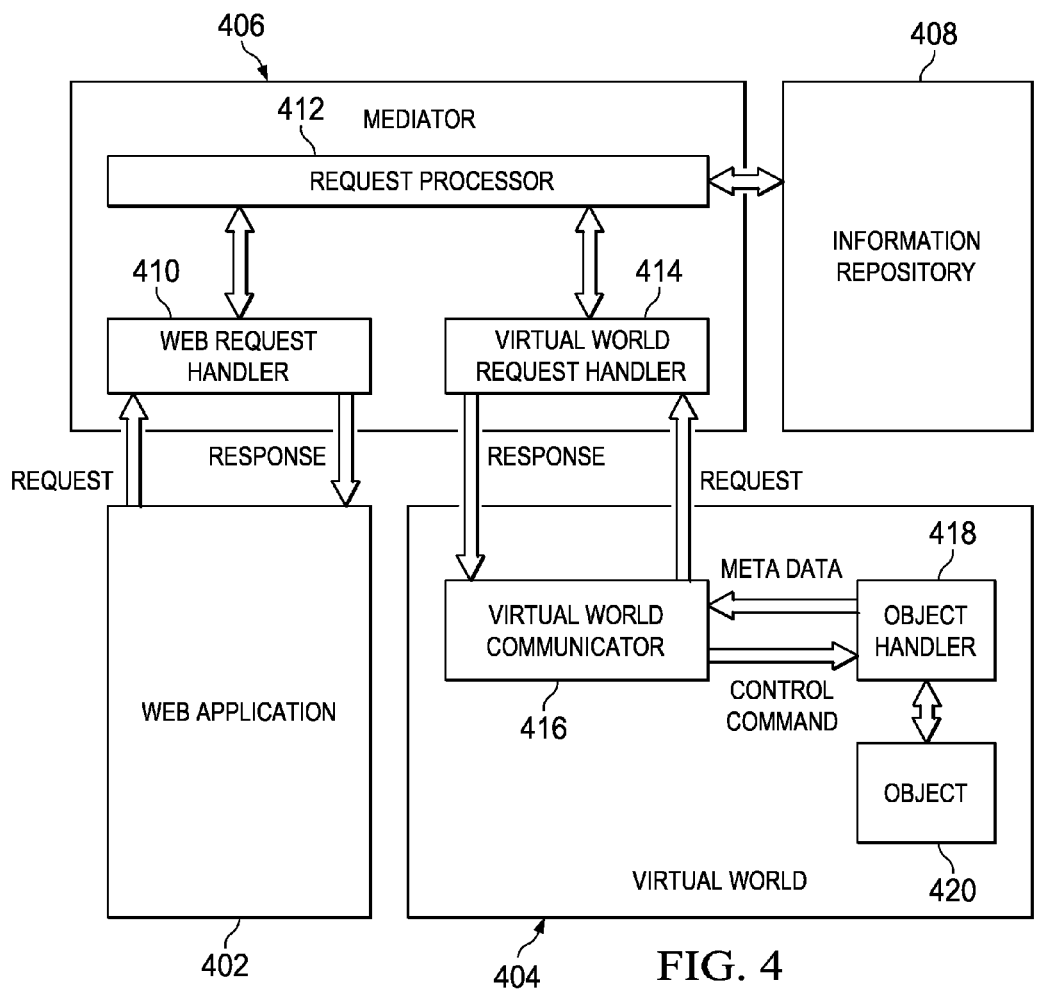
FIG. 4 depicts a detailed architecture of the system in which illustrative embodiments may be implemented.

With reference now to FIGS. 3-4, exemplary diagrams of architecture of the system are provided in which illustrative embodiments may be implemented. It should be appreciated that FIGS. 3-4 are only exemplary and are not intended to assert or imply any limitation with regard to the environments in which different embodiments may be implemented. Many modifications to the depicted environments may be made.

FIG. 3 depicts a pictorial representation of a high-level architecture of the system in which the illustrative embodiments may be implemented. Web Application 302 is an application accessed via the Web over a network, such as network 102 in FIG. 1. Web Application 302 provides a user interface through a Web browser with which a user may control and assess the system. Virtual World 304 is a computer-based simulated environment intended for its users to inhabit and interact via avatars. Virtual World 304 has a 3D client interface, which may be implemented in a client such client 110, 112, or 114 in FIG. 1.

Mediator 306 is a server that interfaces with and facilitates communications between Web Application 302 and Virtual World 304. The high-level architecture in FIG. 3 is based on a mediator pattern in which Web Application 302 and Virtual World 304 communicate through Mediator 306. Use of the mediator pattern in the illustrative embodiments simplifies the communication between Web Application 302 and Virtual World 304, as both only need to interface with the Mediator 306. It is the mediator's responsibility to bridge the differences in properties, meta-data, and contextual information such that information obtained from Web Application 302 is presented to Virtual World 304 in a meaningful way, and vice versa. In the illustrative embodiments, the Mediator 306 is implemented using the Web server technology.

Mediator 306 also maintains the mapping between Web objects in Web Application 302 and virtual world objects in Virtual World 304 using Information Repository 308. In one example, Information Repository 308 may be implemented as memory 206 or persistent storage 208 in FIG. 2.

FIG. 4 depicts a detailed architecture of the system in which the illustrative embodiments may be implemented. Web Application 402 and Information Repository 408 are respective examples of Web Application 302 and Information Repository 308 in FIG. 3. Virtual World 404 and Mediator 406 are detailed examples of Virtual World 304 and Mediator 306 in the high-level architecture in FIG. 3. Web Application 402 provides a user interface through a Web browser. Mediator 406 comprises Web Request Handler 410, Request Processor 412, and Virtual World Request Handler 414. Virtual World 404 comprises Virtual World Communicator 416, Object Handler 418, and Virtual World Object 420.

Web Application 402 may make requests to retrieve meta-data of 3D virtual world objects in Virtual World 404 which are mapped to Web objects managed by Web Application 402. Web Application 402 may also send meta-data about the Web Application's objects to Virtual World 404. Web Application 402 may use the 3D meta-data obtained from Virtual World 404 to enrich the user experience of using Web Application 402, or to enhance the knowledge and information about the objects displayed by Web Application 402. Furthermore, Web Application 402 may also make requests to send commands or events to control the 3D representation of the Web Application's objects in Virtual World 404. Web Application 402 makes requests to retrieve information, sends information, or sends commands or events through Web Request Handler 410 of Mediator 406.

Web Request Handler 410 handles requests from Web Application 402. An example of a request from Web Application 402 includes a request for virtual world meta-data of one or more virtual world objects to which a given Web object within Web Application 402 is linked. Another example of a request from Web Application 402 includes a request to send control commands or events to the virtual objects that are linked to a given Web object within Web Application 402. In one embodiment, requests are buffered and sent sequentially to Request Processor 412 to improve efficiency. Web request handler 410 also sends a response (e.g., the requested meta-data) back to requesting Web Application 402.

Request Processor 412 communicates with Web Request Handler 410 and Virtual World Request Handler 414. Request Processor 412 processes each request, and sends the retrieved meta-data back to specific request handler which made the meta-data request. Request processor 412 accesses Information Repository 408 to store and retrieve the meta-data for both the Web objects and the virtual world objects.

In one embodiment, Information Repository 408 stores information to be shared across the Web and the virtual world. Web Request Handler 410 and Virtual World Request Handler 414 receive meta-data from Web Application 402 and Virtual World 404 respectively, and rely on Request Processor 412 to store the meta-data in Information Repository 408. Web Request Handler 410 and Virtual World Request Handler 414 also take requests for meta-data from Web Application 402 and Virtual World 404 respectively. These request handlers rely on Request Processor 412 to retrieve the requested meta-data from Information Repository 408, and the requested meta-data is then sent to the requesting Web Application 402 and Virtual World 404 respectively.

In one embodiment, Request Processor 412 also stores the mapping relationships between the Web objects and the virtual world objects in Information Repository 406. The Web objects and virtual world objects are each uniquely identified by a Uniform Resource Locator (URL). Those skilled in the art will appreciate that a URL is only one form of unique ID, and other forms of unique ID such as Universally Unique Identifier (UUID) may also be used to uniquely identify Web objects and virtual world objects. Using the URL of a given Web object, Request Processor 412 queries Information Repository 408 to retrieve the URLs of all virtual world objects to which the given Web object is linked. Conversely, using the URL of a given virtual world object, Request processor 412 may query Information Repository 408 to retrieve the URLs of all Web objects to which said virtual world object is linked.

Information Repository 408 also stores the meta-data associated with each Web object or virtual world object. The meta-data is retrievable using the URL of its associated object. The meta-data associated with any given object may include the property information, the contextual information, or any application-specific information about the object. For example, for a virtual world object, the property information may include the color, the size, and the location of the virtual world object, the contextual information may include the environment of the virtual world object, and the application-specific information may be any arbitrary data generated by a particular application. In another example, for a Web object, the property information may include the text description and picture of a Web object, the contextual information may include the higher-level group or category to which Web object belongs, and the application-specific information may be any arbitrary data generated by a particular application.

Virtual World Request Handler 414 handles requests from Virtual World Application 404. A request made from Virtual World Application 404 may include a request to retrieve the meta-data associated with one or more Web objects linked to a virtual world object within Virtual World Application 404. Another request may include a request to send the meta-data of a virtual world object to Request Processor 412 for storage in Information Repository 408. In one embodiment, multiple requests from Virtual World 404 may be buffered, and then sent sequentially to Request Processor 412 to improve efficiency. Virtual World Request Handler 414 sends a response (e.g., in the form of meta-data) back to requesting Virtual World 404.

When Virtual World 404 wants to store meta-data for a virtual world object in Information Repository 408, Virtual World Communicator 416 receives meta-data from Object Handler 418 of this virtual world object. Virtual World Communicator 416 may buffer the meta-data, and periodically send the meta-data to an external world interface, such as Virtual World Request Handler 414. Virtual World Communicator 416 also receives control commands and meta-data from external interface such as Virtual World Request Handler 414. Upon receiving such information, Virtual World Communicator 416 forwards this control command and meta-data to appropriate Object Handler 418.

An object handler such as Object Handler 418 is associated with each virtual world object. Object Handler 418 monitors and controls the behavior (e.g. visual property, spatial property) of Virtual World Object 420. Periodically, Object Handler 418 retrieves the current state and meta-data (e.g., location) from object 420. Object handler 418 then converts current state of object 420 and meta-data to proper meta-data form, and passes this information to Virtual World Communicator 416, which knows how and where to send this meta-data. Object Handler 418 also receives meta-data and control commands or events from Virtual World Communicator 416. Upon receiving a command, Object Handler 418 executes the command on its associated virtual world object. Thus, Object Handler 418 may modify object properties by command execution.

Although not shown in FIG. 4, Web Application 402 may also comprise a Web communicator and an object handler. Web Application 402 may process requests for meta-data, store meta-data in Information Repository 408, and execute commands on Web object properties in the same manner as described for Virtual World 404.

Figure 5:
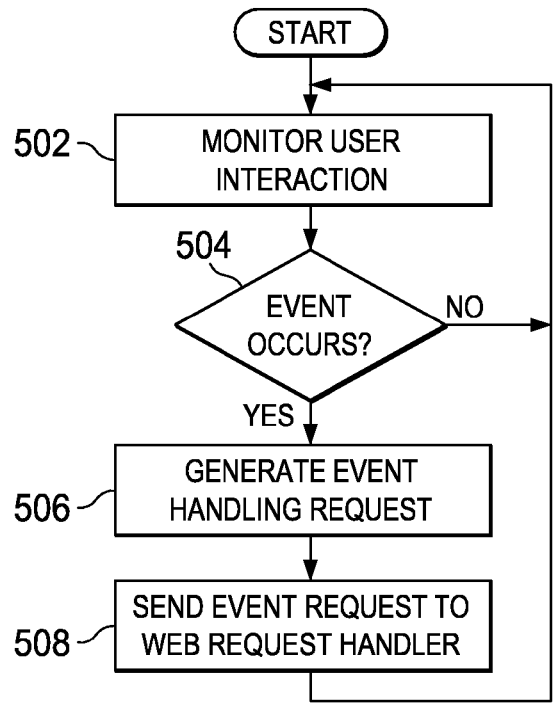
FIG. 5 depicts a flowchart of a high-level process implemented by Web applications in accordance with the illustrative embodiments.

FIG. 5 depicts a flowchart of a high-level process implemented by Web Application 402 in FIG. 4 in accordance with the illustrative embodiments. The process begins with the Web application monitoring user interaction (step 502). A determination is made as to whether an event has occurred (step 504), such as when a user accesses a Web object in the Web application (e.g., by following the Web object's link) and the Web application goes on to request the meta-data of virtual world objects linked by this Web object. If an event has occurred ('yes' output of step 504), the Web application generates an event handling request (step 506). The event handling request is sent to Web Request Handler 410 in Mediator 406 in FIG. 4 (step 508). The process may then loop back to step 502 where the Web application continues to monitor user interaction on the Web application.

Turning back to step 504, if an event has not occurred ('no' output of step 504), the process continues to monitor the user interaction in step 502.

Figure 6:
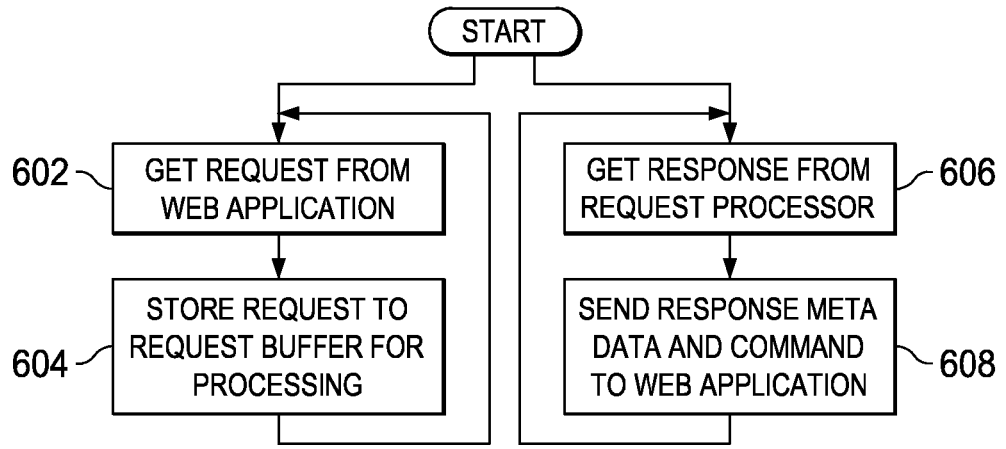
FIG. 6 depicts a flowchart illustrating how requests from Web applications are handled in accordance with the illustrative embodiments.

FIG. 6 depicts a flowchart illustrating how event handling requests are handled by a Web request handler in accordance with the illustrative embodiments. In particular, FIG. 6 illustrates the processes implemented by Web Request Handler 410 in Mediator 406 for handling requests from Web Application 402 in FIG. 4.

In one process implemented by the Web request handler, the process begins with the Web request handler receiving an incoming request generated by a Web application in step 502 in FIG. 5 (step 602). Web request handler stores the request to a request buffer in the mediator (step 604).

In another process implemented by the Web request handler, the Web request handler receives a response (e.g., a response containing virtual object meta-data) from Request Processor 412 in FIG. 4 (step 606). The Web request handler then sends the response to the requesting Web application (step 608).

Figure 7:
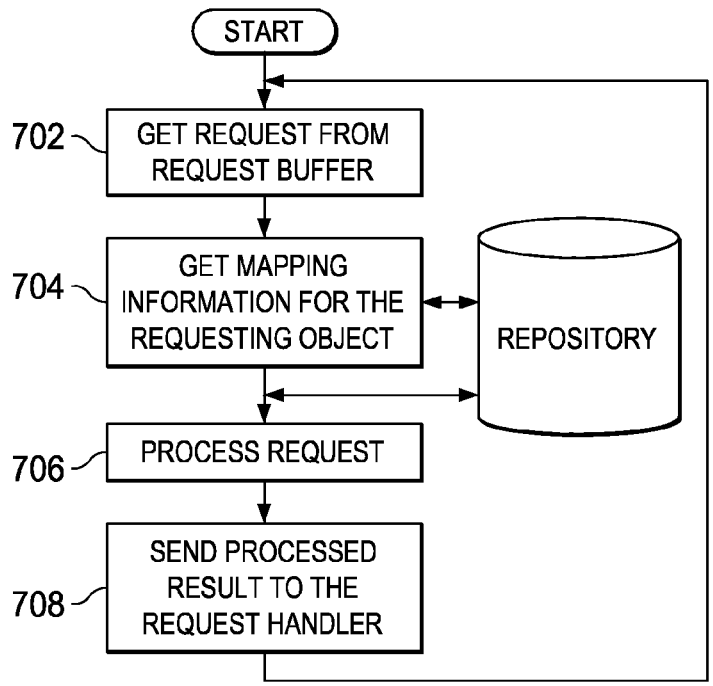
FIG. 7 depicts a flowchart illustrating how requests from both Web applications and virtual world systems are processed in accordance with the illustrative embodiments.

FIG. 7 depicts a flowchart illustrating how requests from both Web applications and virtual world applications are processed by Request Processor 412 in FIG. 4 in accordance with the illustrative embodiments. The process begins in response to step 604 in FIG. 6 with the request processor obtaining the request stored in the request buffer (step 702). The request processor obtains mapping relationship information for the Web object accessed by the user (i.e., requesting object) from Information Repository 408 in FIG. 4 (step 704). The request processor then processes the request (step 706), and sends the processed result to Web request handler 410 in FIG. 4 (step 708).

For example, a Web application may request the meta-data associated with the virtual world objects that are linked to one of its Web objects. In this case, upon receiving this request, the request processor first queries the information repository for all virtual world objects linked to the Web object using the mapping relationship information. Next, for all of the virtual world objects found to be linked to the Web object, the request processor queries the information repository to obtain the associated meta-data for the linked virtual world objects. The request processor then forwards the meta-data to the Web request handler.

Figure 8:
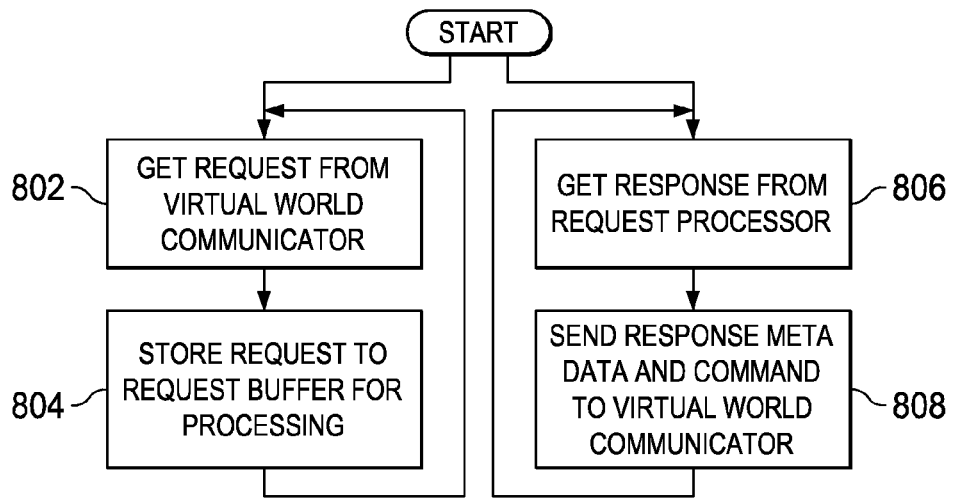
FIG. 8 depicts a flowchart illustrating how requests from Virtual world systems are handled in accordance with the illustrative embodiments.

FIG. 8 depicts a flowchart illustrating how requests from virtual world applications are handled by a virtual world request handler in accordance with the illustrative embodiments. In particular, FIG. 8 illustrates the processes implemented by Virtual World Request Handler 414 in Mediator 406 for handling requests from Web Application 402 in FIG. 4.

In one process implemented by the virtual world request handler, the process begins with the virtual world request handler receiving an incoming request generated by a virtual world application (step 802). Virtual World request handler stores the request to a request buffer in the mediator (step 804).

In another process implemented by the virtual world request handler, the virtual world request handler receives a response (e.g., a response containing Web object meta-data) from Request Processor 412 in FIG. 4 (step 806). The virtual world request handler then sends the response to the requesting virtual world application (step 808).

Figure 9:
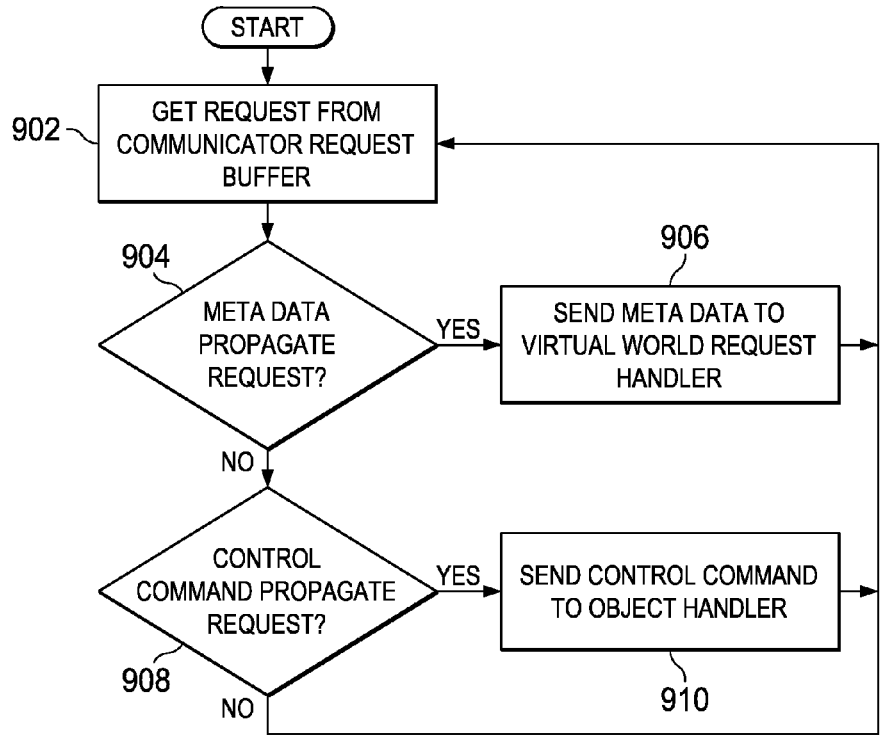
FIG. 9 depicts a flowchart illustrating how virtual world meta-data are communicated to the external interface in accordance with the illustrative embodiments.

FIG. 9 depicts a flowchart illustrating how virtual world meta-data are communicated to the external interface by Virtual World Communicator 416 in FIG. 4 in accordance with the illustrative embodiments. The process begins with the virtual world communicator obtaining a request stored in the request buffer of virtual world communicator 416 in FIG. 4 (step 902). A determination is made by the virtual world communicator as to whether the request obtained from the request buffer is a request to propagate meta-data (step 904). A request to propagate meta-data is a request generated by the virtual world application to store meta-data for its virtual world objects in the information repository. If the request is a request to propagate meta-data ('yes' output of step 904), the virtual world communicator forwards the request for meta-data to the virtual world request handler in Mediator 406 in FIG. 4 (step 906). The virtual world request handler will process the request as described in FIG. 8.

Turning back to step 904, if the request is not a request to propagate meta-data ('no' output of step 904), the virtual world communicator makes a determination as to whether the request is a request to propagate a control command (step 908). A request to propagate a control command is a request generated by a Web application to change the properties of specific virtual world objects. If the request is a request to propagate a control command ('yes' output of step 908), the virtual world communicator forwards the request for a control command to the appropriate virtual world object handler (step 910). The virtual world object handler will process the request as described in FIG. 10 below.

Turning back to step 908, if the request is not a request to a control command ('no' output of step 908), the process loops back to step 902 to obtain another request in the request buffer.

Figure 10:
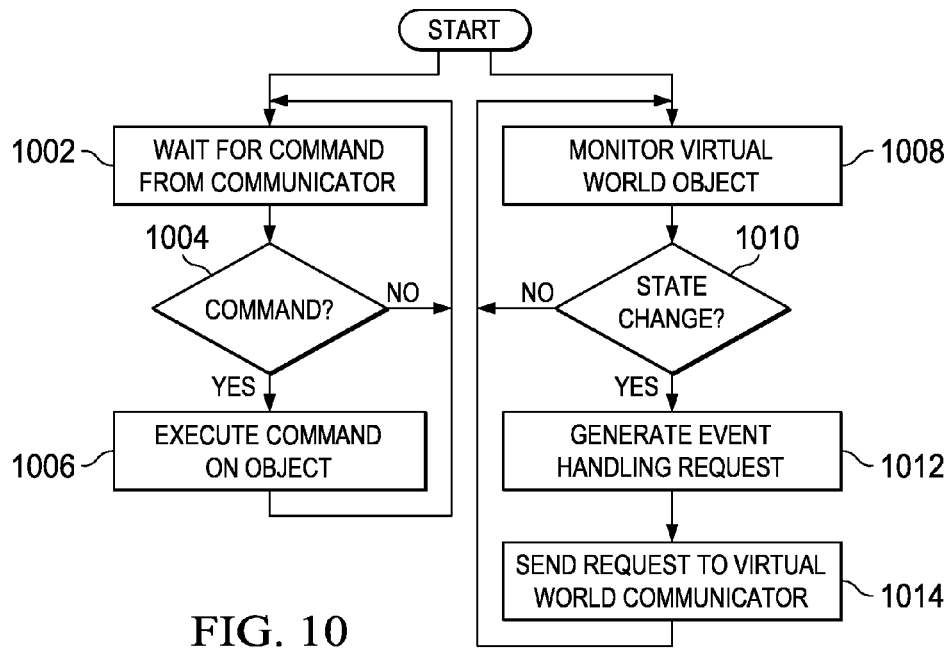
FIG. 10 depicts a flowchart illustrating how virtual world objects are monitored and handled in accordance with the illustrative embodiments.

FIG. 10 depicts a flowchart illustrating how virtual world objects are monitored and handled by virtual world object handlers such as Object Handler 418 in FIG. 4 in accordance with the illustrative embodiments.

In one process implemented by a virtual world object handler, the process begins with the virtual world object handler waiting for a control command from the virtual world communicator (step 1002). A determination is made by the virtual world object handler as to whether a control command has been received from the virtual world communicator (step 1004). If a control command has been received ('yes' output of step 1004), the virtual world object handler executes the command on those virtual world objects managed by the virtual world object handler (step 1006). The process loops back to step 1002 where the virtual world object handler continues to wait for a command from the virtual world communicator.

Turning back to step 1004, if a control command has not been received ('no' output of step 1004), the virtual world object handler loops back to step 1002 to continue to wait for a command from the virtual world communicator.

In another process implemented by a virtual world object handler, the process begins with the virtual world object handler monitoring the virtual world object managed by the virtual world object handler (step 1008). A determination is made by the virtual world object handler as to whether a state change has occurred to the virtual world object it monitors (step 1010). If a state change has occurred ('yes' output of step 1010), the virtual world object handler generates an event handling request (step 1012). The event handling request sends the request to the virtual world communicator (step 1014), wherein the virtual world communicator handles the request as described in FIG. 9. The process loops back to step 1008 where the virtual world object handler continues to monitor the state of its virtual world object.

Turning back to step 1010, if a state change has not occurred ('no' output of step 1010), the process loops back to step 1008 where the virtual world object handler continues to monitor the state of its virtual world object.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for sharing information between software objects managed by a non-virtual world interface and virtual world objects managed by a virtual world interface, the computer implemented method comprising:
    maintaining, by a mediator that enables communication between a non-virtual world and a virtual world, a mapping between web objects in a web application that provides a two-dimensional representation of the virtual world and virtual world objects in the virtual world using an information repository connected only to the mediator, wherein the information repository stores meta-data for both the web objects and the virtual world objects for retrieval by the mediator;
    receiving, by the mediator, a request from the non-virtual world interface for particular meta-data about one or more virtual world objects in the virtual world that are linked to a web object of the web application, wherein the web object is a two-dimensional object, wherein the one or more virtual world objects are three-dimensional objects, and wherein the virtual world is a software application that provides a computer-based simulated environment represented in a three-dimensional representation that mimics a real-world environment;
    obtaining, by the mediator, mapping information linking the web object to the one or more virtual world objects from the information repository;
    retrieving, by the mediator, the meta-data about the one or more virtual world objects using identifiers in the mapping information; and
    sending, by the mediator, the meta-data about the one or more virtual world objects to the non-virtual world interface.

2. The computer implemented method of claim 1, further comprising:
    receiving, by the mediator, a request from the virtual world interface for meta-data about one or more web objects linked to a virtual world object;
    obtaining, by the mediator, mapping information linking the virtual world object to the one or more web objects from the information repository;
    retrieving, by the mediator, the meta-data about the one or more web objects using identifiers in the mapping information; and
    sending, by the mediator, the meta-data about the one or more web objects to the virtual world interface.

3. The computer implemented method of claim 1, further comprising:
    receiving, by the mediator, a request from the non-virtual world interface to store meta-data about the web object; and
    storing, by the mediator, the meta-data about the web object in the information repository, wherein the meta-data about the web object is retrievable by the virtual world interface using the mapping information.

4. The computer implemented method of claim 1, further comprising:
    receiving, by the mediator, a request from the virtual world interface to store meta-data about the virtual world object; and
    storing, by the mediator, the meta-data about the virtual world object in the information repository, wherein the meta-data about the virtual world object is retrievable by the non-virtual world interface using the mapping information.

5. The computer implemented method of claim 2, wherein the receiving, obtaining, retrieving, and sending steps are implemented using the mediator, wherein the mediator is a server external to the virtual world interface and non-virtual world interface.

6. The computer implemented method of claim 5, wherein the server is a Web server.

7. The computer implemented method of claim 1, wherein the web application includes the non-virtual world interface, and wherein, a further request comprises sending a command to modify at least one of the virtual world objects that are linked to a given web object within the web application.

8. The computer implemented method of claim 5, wherein the mediator resolves the identifiers in the mapping information for the one or more virtual world objects and retrieves the meta-data about the one or more virtual world objects using the resolved identifiers.

9. The computer implemented method of claim 2, further comprising:
   responsive to receiving multiple requests for meta-data, caching, by the mediator, results for the multiple requests;
   responsive to receiving from the non-virtual world interface a periodic poll for requested virtual world object meta-data, forwarding, by the mediator, the requested virtual world object meta-data to the non-virtual world interface; and
   responsive to receiving from the virtual world interface a periodic poll for requested web object meta-data, forwarding, by the mediator, the requested web object meta-data to the virtual world interface.

10. The computer implemented method of claim 2, further comprising:
    receiving, at the virtual world interface, a command or event from the non-virtual world interface, wherein the command or event targets one or more virtual world objects; and
    processing the command or event on the targeted one or more virtual world objects.

11. The computer implemented method of claim 2, further comprising:
    receiving, at the non-virtual world interface, a command or event from the virtual world interface, wherein the command or event targets one or more web objects; and
    processing the command or event on the targeted one or more web objects.

12. A data processing system for sharing information between software objects managed by a non-virtual world interface and virtual world objects managed by a virtual world interface, the data processing system comprising:
    a bus of a mediator that enables communication between a non-virtual world and a virtual world;
    a storage device connected to the bus, wherein the storage device contains computer usable code;
    at least one managed device connected to the bus;
    a communications unit connected to the bus and to the Internet; and
    a processing unit connected to the bus, wherein the processing unit executes the computer usable code to:
    maintain a mapping between web objects in a web application that provides a two-dimensional representation of the virtual world and virtual world objects in the virtual world using an information repository connected only to the mediator, wherein the information repository stores meta-data for both the web objects and the virtual world objects for retrieval by the mediator;
    receive a request from the non-virtual world interface for meta-data about one or more virtual world objects of the virtual world that are linked to a web object of a web application, wherein the web object is a two-dimensional object, wherein the one or more virtual world objects are three-dimensional objects, and wherein the virtual world is a software application that provides a computer-based simulated environment represented in a three-dimensional representation that mimics a real-world environment;
    obtain mapping information linking the web object to the one or more virtual world objects from the information repository on the server;
    retrieve the meta-data about the one or more virtual world objects using identifiers in the mapping information; and
    send the meta-data about the one or more virtual world objects to the non-virtual world interface.

13. A computer program product for sharing information between software objects managed by a non-virtual world interface and virtual world objects managed by a virtual world interface, the computer program product comprising:
    a computer usable storage device having computer usable program code tangibly embodied thereon, the computer usable program code comprising:
    computer usable program code for maintaining, by a mediator that enables communication between a non-virtual world and a virtual world, a mapping between web objects in a web application that provides a two-dimensional representation of the virtual world and virtual world objects in the virtual world using an information repository connected only to the mediator, wherein the information repository stores meta-data for both the web objects and the virtual world objects for retrieval by the mediator;
    computer usable program code for receiving, by the mediator, a request from the non-virtual world interface for meta-data about one or more virtual world objects of the virtual world that are linked to a web object of a web application, wherein the web object is a two-dimensional object, wherein the one or more virtual world objects are three-dimensional objects, and wherein the virtual world is a software application that provides a computer-based simulated environment represented in a three-dimensional representation that mimics a real-world environment;
    computer usable program code for obtaining, by the mediator, mapping information linking the non-virtual web software object to the one or more virtual world objects from the information repository;
    computer usable program code for retrieving, by the mediator, the meta-data about the one or more virtual world objects using identifiers in the mapping information; and
    computer usable program code for sending, by the mediator, the meta-data about the one or more virtual world objects to the non-virtual world interface.

14. The computer program product of claim 13, further comprising:
    computer usable program code for receiving, by the mediator, a request from the virtual world interface for meta-data about one or more web objects linked to a virtual world object;
    computer usable program code for obtaining, by the mediator, mapping information linking the virtual world object to the one or more web objects;

computer usable program code for retrieving the meta-data about the one or more web objects using identifiers in the mapping information; and computer usable program code for sending, by the mediator, the meta-data about the one or more web objects to the virtual world interface.

15. The computer program product of claim 13, further comprising:

computer usable program code for receiving, by the mediator, a request from the non-virtual world interface to store meta-data about the web object; and computer usable program code for storing, by the mediator, the meta-data about the web object in the information repository, wherein the meta-data about the web object is retrievable by the virtual world interface using the mapping information.

16. The computer program product of claim 13, further comprising:

computer usable program code for receiving, by the mediator, a request from the virtual world interface to store meta-data about the virtual world object; and computer usable program code for storing, by the mediator, the meta-data about the virtual world object in the information repository, wherein the meta-data about the virtual world object is retrievable by the non-virtual world interface using the mapping information.

17. The computer program product of claim 14, further comprising:

computer usable program code for caching, by the mediator, results for the multiple requests in response to receiving multiple requests for meta-data;

computer usable program code for forwarding by the mediator, in response to receiving from the non-virtual world interface a periodic poll for requested virtual world object meta-data, the requested virtual world object meta-data to the non-virtual world interface; and computer usable program code for forwarding by the mediator, in response to receiving from the virtual world interface a periodic poll for requested web object meta-data, the requested web object meta-data to the virtual world interface.

18. The computer program product of claim 14, further comprising:

computer usable program code for receiving at the virtual world interface, a command or event from the non-virtual world interface, wherein the command or event targets one or more virtual world objects; and computer usable program code for processing the command or event on the targeted one or more virtual world objects.

19. The computer program product of claim 14, further comprising:

computer usable program code for receiving, at the non-virtual world interface, a command or event from the virtual world interface, wherein the command or event targets one or more web objects; and computer usable program code for processing the command or event on the targeted one or more web objects.

20. The computer implemented method of claim 1, further comprising, generating an event handling request when a state change occurs for the one or more virtual world objects, wherein a web request handler communicates the event handling request to the web application.

21. The computer implemented method of claim 1, wherein the non-virtual world interface is used to create one or more new virtual world objects.

22. The computer implemented method of claim 1, wherein the virtual world interface is used to create one or more new web objects.

23. The computer implemented method of claim 1, wherein a web request handler receives data from the web application and sends data to the web application.

24. The computer implemented method of claim 1, wherein the virtual world objects and the web objects are each identified by a unique ID.

* * * * *